United States Patent
Vardi

(10) Patent No.: US 8,060,420 B2
(45) Date of Patent: Nov. 15, 2011

(54) GIFT CARD REIMBURSEMENT SYSTEM AND METHOD

(76) Inventor: Gil Vardi, Town and Country, MO (US)

( * ) Notice: Subject to any disclaimer, the term of this patent is extended or adjusted under 35 U.S.C. 154(b) by 351 days.

(21) Appl. No.: 11/809,977

(22) Filed: Jun. 4, 2007

(65) Prior Publication Data

US 2008/0301044 A1  Dec. 4, 2008

(51) Int. Cl.
*G06Q 40/00* (2006.01)
(52) U.S. Cl. ............................................. 705/35; 705/39
(58) Field of Classification Search .................... 705/41, 705/35, 39
See application file for complete search history.

(56) References Cited

U.S. PATENT DOCUMENTS

| | | |
|---|---|---|
| 3,852,571 A | 12/1974 | Hall et al. |
| 3,934,122 A | 1/1976 | Riccitelli |
| 4,172,552 A | 10/1979 | Case et al. |
| 4,277,837 A | 7/1981 | Stuckert |
| 4,341,951 A | 7/1982 | Benton |
| 4,454,414 A | 6/1984 | Benton |
| 4,490,798 A | 12/1984 | Franks et al. |
| 4,747,049 A | 5/1988 | Richardson et al. |
| 4,900,903 A | 2/1990 | Wright et al. |
| 5,471,669 A | 11/1995 | Lidman |
| 5,704,046 A * | 12/1997 | Hogan ............................ 705/39 |
| 2003/0053609 A1* | 3/2003 | Risafi et al. ................. 379/114.2 |
| 2006/0080236 A1* | 4/2006 | Welker et al. ..................... 705/40 |
| 2006/0213980 A1* | 9/2006 | Geller et al. .................... 235/380 |
| 2007/0124238 A1* | 5/2007 | Hogg et al. ...................... 705/38 |
| 2007/0233615 A1* | 10/2007 | Tumminaro ..................... 705/75 |

OTHER PUBLICATIONS

PCT, International Search Report of PCT/US2008/065661, dated Dec. 17, 2009, 5 pages.

* cited by examiner

*Primary Examiner* — Ella Colbert
*Assistant Examiner* — John Anderson
(74) *Attorney, Agent, or Firm* — Armstrong Teasdale LLP

(57) ABSTRACT

A method for purchasing goods and services in transactions utilizing a valued card includes issuing to a card owner from an issuing institution a valued card pursuant to an agreement between the card owner and the issuing institution. The valued card has a purchase value. The valued card is transferred to a recipient having authority to purchase goods and services utilizing at least a portion of the purchase value. The card owner is reimbursed a percentage of a remaining balance of the purchase value at an expiration date pursuant to the agreement.

23 Claims, 2 Drawing Sheets

US 8,060,420 B2

GIFT CARD REIMBURSEMENT SYSTEM AND METHOD

BACKGROUND OF THE INVENTION

This invention relates generally to debit cards and, more particularly, to a valued card system and method that reimburses the purchaser a percentage of a balance remaining unused by a recipient at the expiration date of the valued card.

Commercial transactions involving payment for goods and/or services typically involve some form of transfer of funds between the purchaser and the seller. Such transfers may include a payment by cash, check or any suitable negotiable instrument. Such payments may also be made using a credit card or a debit card. Credit cards and debit cards have enjoyed increasing popularity for payment on accounts and for purchasing goods and/or services due to the distinct advantages associated with credit cards and debit cards, including privacy and security advantages. More specifically, if a card is lost or stolen, its owner is normally exposed to only limited liability, if any, for its misuse. Further, various security measures tend to minimize unauthorized card usage. By verifying cardholder identities and by invoking other security measures, commercial institutions have achieved some measure of success in curbing credit/debit card fraud.

A banking institution issues a credit card to a card owner under an agreement including terms and conditions in which the card owner is responsible for payment on an account. For example, when the card owner purchases goods and/or services on the credit card a balance is created on the account to essentially provide a line of credit. Pursuant to the agreement, the card owner is responsible for payments on the balance.

In contrast to credit cards, a debit card facilitates transferring funds from a card owner's account, such as from a corresponding checking account established with a banking institution. The funds transferred during a transaction for goods and/or services are deposited in the card owner account prior to the transaction. Thus, unlike a credit card that establishes a line of credit, a debit card transaction is limited by the amount of funds deposited in the corresponding checking account at the transaction time.

A gift card is one type of debit card. A purchaser purchases a gift card from a shopping mall, a department store, a grocery store or another point-of-sale retail establishment in a desired amount or denomination, such as $50.00, $100.00 or $250.00. The purchaser gifts the gift card to a recipient, who is then free to purchase goods and/or services of his or her choice with the gift card utilizing all or only a portion of the value on the gift card. Many conventional gift cards include expiration dates on which the gift card expires and any balance of the value is no longer available for use. At least some gift cards expire over a time period. For example, on the purchase date a purchaser may purchase a gift card having a purchased value of $100.00. At one year from the purchase date, the gift card may have a maximum value of $50.00 and at two years from the purchase date the gift card may have a maximum value of $0.00. Any portion of the purchase value unused at the expiration date results in an earlier transfer of funds to the issuing institution without an obligation to transfer any goods or services to the recipient and/or to reimburse the purchaser for any remaining balance of the purchased value.

BRIEF DESCRIPTION OF THE INVENTION

In one aspect, a method for purchasing goods and services in transactions utilizing a valued card is provided. The method includes issuing to a card owner from an issuing institution a valued card pursuant to an agreement between the card owner and the issuing institution. The valued card has a purchase value. The valued card is transferred to a recipient having authority to purchase goods and services utilizing at least a portion of the purchase value. The card owner is reimbursed a percentage of a remaining balance of the purchase value at an expiration date pursuant to the agreement.

In another aspect, a valued card system is provided. The valued card system includes a card owner account established with an issuing institution pursuant to an agreement between the card owner and the issuing institution. A valued card is issued from the issuing institution to the card owner. The valued card has a purchase value funded by the card owner account authorizing a recipient to purchase goods and services utilizing at least a portion of the purchase value upon transfer of the valued card from the card owner to the recipient. A first computer located at the issuing institution is in communication with a second computer located at a point-of-sale retail establishment. The first computer is configured to authorize a transaction between the recipient and the point-of-sale retail establishment to purchase the at least one of goods and services utilizing the valued card. A price of the purchased goods and services is debited from the purchase value in response to the transaction to adjust a remaining balance on the card owner account. The card owner is reimbursed a percentage of the remaining balance at an expiration date pursuant to the agreement.

DETAILED DESCRIPTION OF THE INVENTION

Figure 1:
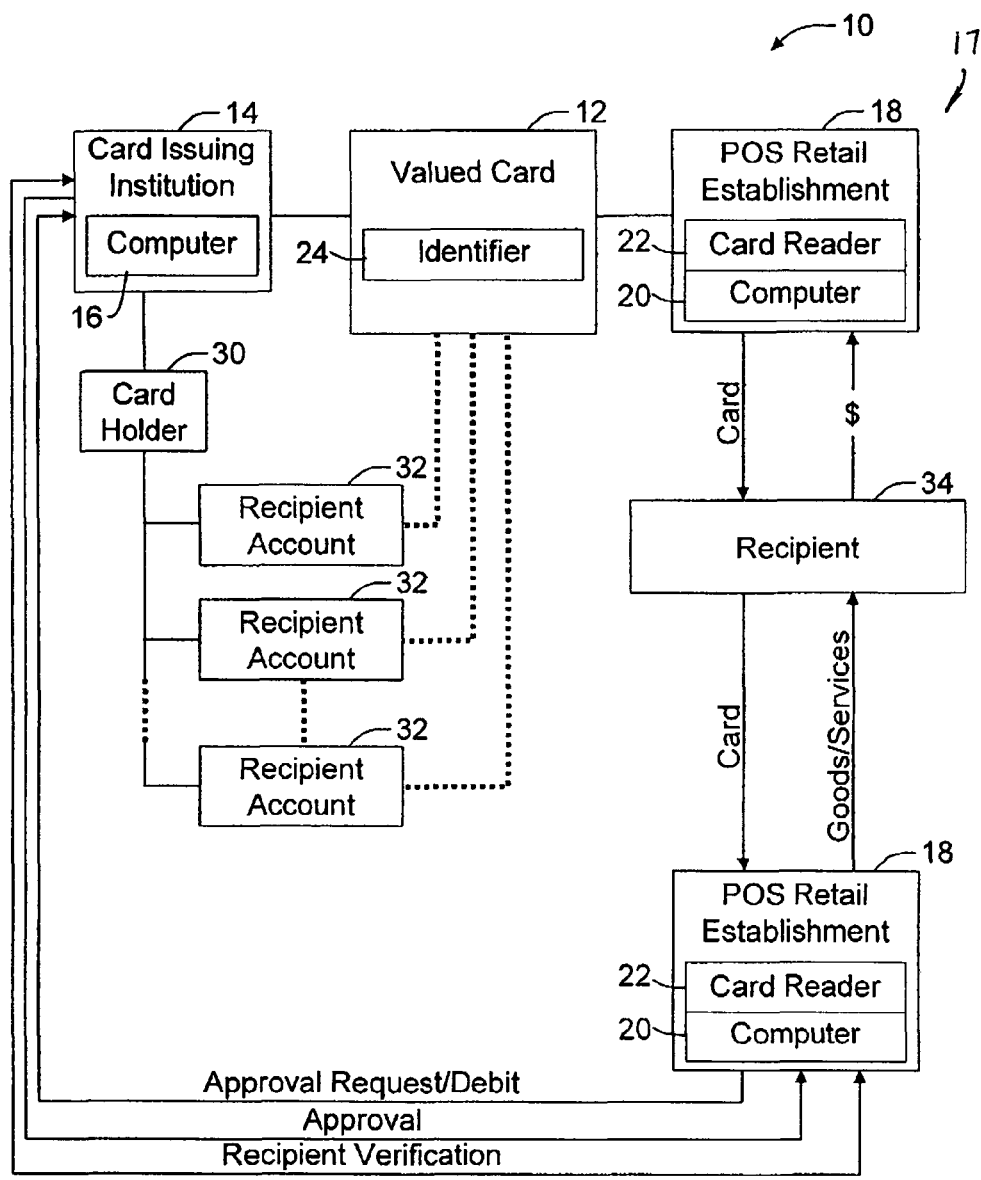
FIG. 1 is a schematic block diagram of an exemplary valued card system.
Figure 2:
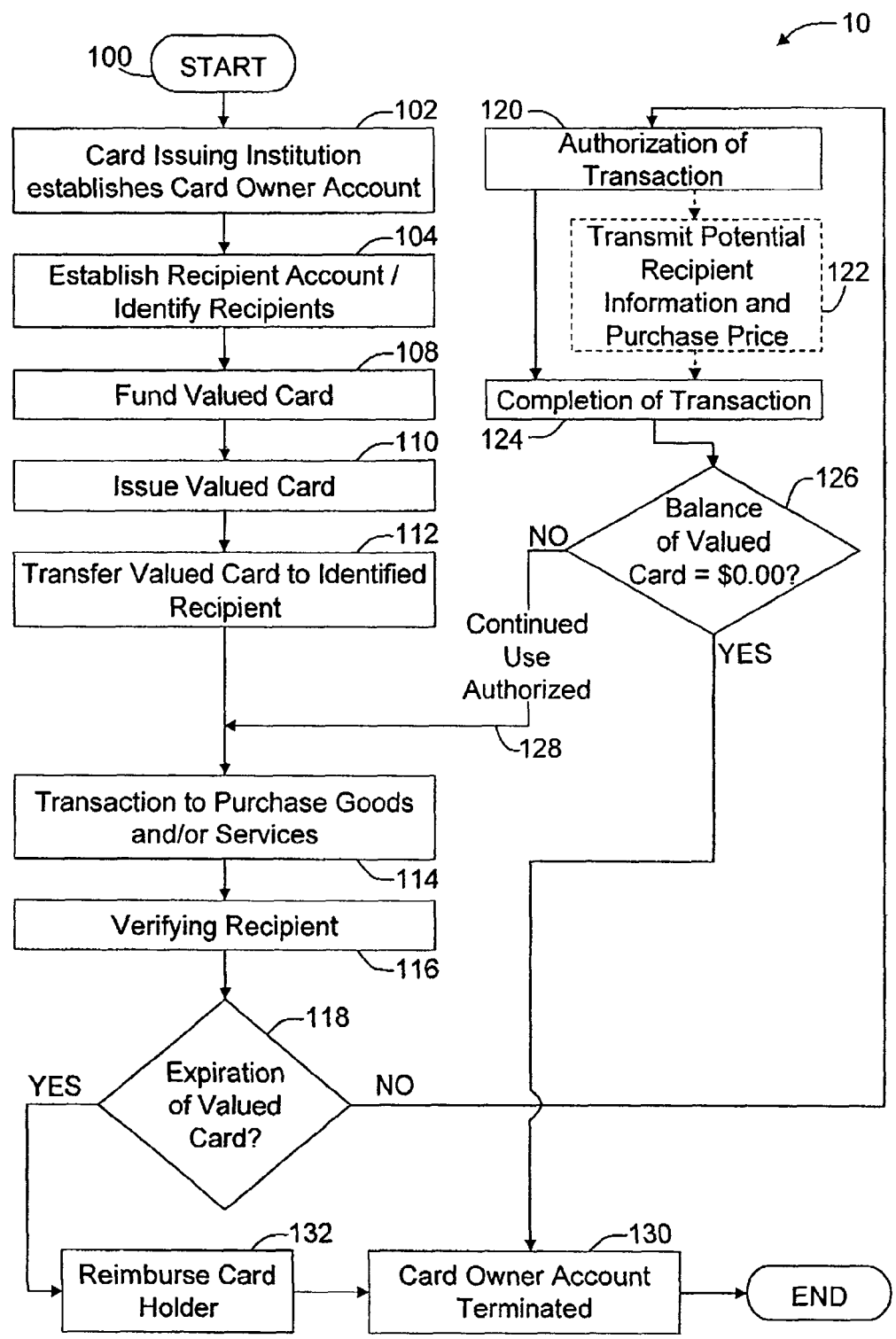
FIG. 2 is a flow diagram of a method for purchasing goods and services in transactions utilizing a valued card.

Referring to FIGS. 1 and 2, in one embodiment a system 10 is provided for purchasing goods and/or services using a valued card 12. In this embodiment, valued card 12 is a debit card that may be presented to a recipient as a gift card, as described in greater detail below. In alternative embodiments, valued card 12 is any suitable card including, without limitation, a credit card or a gift card. System 10 includes a card issuing institution 14 such as any suitable financial institution including, without limitation, a bank, a credit card or debit card company or a credit union. It should be apparent to those skilled in the art and guided by the teachings herein provided that card issuing institution 14 may include any suitable institution capable of performing the responsibilities associated with issuing a credit card and/or a debit card. As shown in FIG. 1, card issuing institution 14 includes at least one computer 16 or a network of computers to facilitate operating system 10.

System 10 also includes a point-of-sale (POS) retail establishment network 17 that includes merchants and/or other entities providing goods and/or services generally described herein as POS retail establishments 18. Point-of sale retail establishment network 17 may include multiple, different POS retail establishments 18, such as stores within a shopping mall, and/or may include multiple, similar POS retail establishments, such as franchise or chain stores. Although two POS retail establishments 18 are shown in FIG. 1, it should be apparent to those skilled in the art and guided by the teachings herein provided that POS retail establishment network 17 may include any suitable number of POS retail establishments 18. In one embodiment, computer 16 is in communication with POS retail establishment network 17 that includes multiple POS retail establishments 18 that accept valued card 12 for the purchase of goods and/or services. In a particular embodiment, each POS retail establishment 18 includes at least one computer 20 in communication with computer 16 of card issuing institution 14 using any suitable communication line. Computers 20 may be hardwired with computer 16 or may be electrically coupled to computer 16 through the Internet or wirelessly, for example. A magnetic card reader 22 is integrated with or operatively coupled to computer 20 and configured to detect an identifier 24, as described in greater detail below, which is encoded onto a magnetic strip of valued card 12.

In one embodiment, each merchant subscribes to a program with card issuing institution 14 to accept valued cards 12 issued by card issuing institution 14. In a particular embodiment, card issuing institution 14 includes a bank or debit card company and POS retail establishment network 17 accepts the valued debit card issued by card issuing institution 14 as one form of payment for goods and/or services provided by POS retail establishment 18 in POS retail establishment network 17. Referring further to FIG. 1, in one embodiment each POS retail establishment 18 in POS retail establishment network 17 issues one or more valued cards 12 to the card owner, under a suitable agreement with card issuing institution 14, and conducts transactions for the goods and/or services sold at the respective POS retail establishment 18. In this embodiment, valued card 12 can be preprinted by card issuing institution 14 for distribution to card owners at POS retail establishment 18. In an alternative embodiment, card owners purchase valued card 12 directly from card issuing institution 14 for later use at one or more POS retail establishments 18 in POS retail establishment network 17. In a further alternative embodiment, POS retail establishment network 17 operates as the card issuing institution.

In one embodiment, system 10 includes suitable security measurements to ensure that valued card 12 is utilized pursuant to the agreement between the card owner and card issuing institution 14. In a particular embodiment, the use of valued card 12 is limited to payment for goods and/or services while preventing use of valued card 12 to directly acquire cash, thus making valued card 12 less inviting for theft and/or misuse. Additionally, POS retail establishment 18 may require the use of magnetic card reader 22 for insuring that valued card 12 is physically present for conducting a transaction. Further, an identifier, such as a personal identification number (PIN), may be assigned to each recipient, which is known to the recipient only for verification of his or her authorization to conduct the transaction. Additionally or alternatively, valued card 12 may also include a unique tracking number. If valued card 12 is lost or stolen, valued card 12 is canceled and a replacement valued card is issued.

Referring further to FIG. 1, a card owner establishes a card owner account 30 with issuing institution 14 pursuant to a suitable contract or agreement, such as a purchase agreement between the card owner and issuing institution 14. One or more valued cards 12 are issued from issuing institution 14 to the card owner upon payment of cash or another suitable form of payment from the card owner to card issuing institution 14. In one embodiment, card issuing institution 14 then credits card owner account 30 with a credit value equal to a purchase value. Each valued card 12 has a purchase value, such as $25, $100 or $250 for example, that is funded by card owner account 30 authorizing a recipient, such as at least one respective identified recipient, to purchase goods and/or services utilizing at least a portion of the purchase value upon transfer of valued card 12 from the card owner to the recipient. For example, the card owner may purchase, valued card 12 to gift to the recipient as a birthday, graduation or wedding gift. In an alternative embodiment, the card owner does not pay for valued card 12 until valued card 12 is utilized by the recipient to purchase goods and/or services. In a particular embodiment, the card owner determines the purchase value of valued card 12. However, the card owner is responsible for payment to card issuing institution 14 for the purchase price of the goods and/or services, up to the purchase value of valued card 12, only upon purchase of the goods and/or services by the recipient utilizing valued card 12. In a particular embodiment, the card owner is billed the purchase price through his or her credit card account, bank account, savings account or any suitable account established with card issuing institution, for example.

In a particular embodiment, card issuing institution 14 distributes unvalued cards to each POS retail establishment 18 in POS retail establishment network 17. Card issuing institution 14 creates a respective card owner account 30 through POS retail establishment 18 to generate valued card 12 having a purchase value selected by the card owner pursuant to an agreement between the card owner and card issuing institution 14. For example, at POS retail establishment 18 a card owner may complete an application to establish a card owner account 30 with card issuing institution 14. Information related to card owner account 30 is transmitted from computer 20 to computer 16 to establish card owner account 30. Upon establishment of card owner account 30 and payment for the purchase value of valued card 12, POS retail establishment 18 issues valued card 12 to the card owner having a purchase value selected by the card owner. Card issuing institution 14 may charge to POS retail establishment network 17 fees associated with establishing, issuing and/or purchasing goods and/or services utilizing valued card 12.

The identified recipient is authorized by the card owner to purchase goods and/or services from associated POS retail establishments 18 using valued card 12. During transactions between the identified recipient and POS retail establishment 18, computer 16 communicates with computer 20 at POS retail establishment 18. Computer 16 is configured to authorize the transaction between the identified recipient and POS retail establishment 18 to purchase goods and/or services utilizing valued card 12. A purchase price of the purchased goods and/or service is debited or deducted from the purchase value in response to the transaction to adjust a remaining balance on card owner account 30. In alternative embodiments, computer 20 is configured to authorize the transaction without necessarily communicating with computer 16.

In one embodiment, computer 16 communicates with computer 20 to authorize a withdrawal of funds equal to the purchase price from card owner account 30 payable to a merchant from whom the goods and/or services are purchased. Computer 16 and/or computer 20 then calculates the remaining balance on card owner account 30, which is equal to a difference between the purchased value of valued card 12 and the purchase price debited from card owner account 30. During the transaction, computer 16 receives from computer 20 a request for authorization of a transaction to support the purchase. The request includes information representative of the purchase price and a potential recipient. Computer 16 and/or computer 20 verifies that the potential recipient is an identified recipient. Computer 16 and/or computer 20 then authorizes the transaction in an amount not exceeding the remaining balance on card owner account 30.

In a further embodiment, system 10 includes at least one recipient account 32 established with card issuing institution 14 pursuant to the agreement between the card owner and card issuing institution 14. Each recipient account 32 designates one or more corresponding identified recipients 34. Computer 16 receives a request for authorization of a transaction to support the purchase. The request includes information representative of the purchase price and a potential recipient. Computer 16 and/or computer 20 verifies that the potential recipient is an identified recipient 34 before the transaction is authorized. Upon verification of identified recipient 34, computer 16 and/or computer 20 authorizes the transaction in an amount not exceeding the remaining balance of a corresponding recipient account 32.

Upon an expiration date as set forth in the agreement between the card owner and card issuing institution 14, the card owner is reimbursed a percentage of the remaining value or balance on card owner account 30 at the expiration date pursuant to the agreement. In a further embodiment, the card owner earns interest at a rate set forth in the agreement. For example, the card owner may earn interest on the purchase value until the recipient uses valued card 12, and/or the card owner may earn interest on the remaining balance of valued card 12 over the life of valued card 12. Computer 16 is further configured to determine the remaining balance at the expiration date to facilitate reimbursing the card owner the percentage of the remaining balance at the expiration date and/or pay the card owner interest at a rate set forth in the agreement, if applicable. In a particular embodiment, computer 16 is also configured to generate a negotiable instrument, such as a printed check, payable to the card owner to facilitate reimbursing the card owner the agreed percentage of the remaining balance at the expiration date. Upon expiration of the agreement, card owner account 30 is terminated by card issuing institution 14. In one embodiment, computer 16 is configured to terminate card owner account 30.

FIG. 2 is a flow chart describing a method for purchasing goods and/or services in transactions utilizing valued card system 10. The method starts 100 with card issuing institution 14 establishing 102 a card owner account 30. In one embodiment, the card owner provides information on an application. Based on this information, card issuing institution 14 establishes card owner account 30 under terms and conditions of an agreement. The agreement may include, without limitation, an expiration date and a selected percentage of return upon expiration of the agreement. In a particular embodiment, one or more recipient accounts are established 104 to identify respective recipients 34 authorized to conduct transactions utilizing valued card 12. The card owner decides a suitable denomination for valued card 12 for presentation, such as by gift, to identified recipient 34 and the valued card is funded 108. Card issuing institute 14 issues 110 to the card owner a valued card 12 having a purchase value pursuant to the agreement between the card owner and card issuing institution 14. In a particular embodiment, card owner account 30 is credited with a credit value equal to the purchase value when valued card 12 is issued by card issuing institution 14 to the card owner pursuant to the agreement. In an alternative embodiment, card issuing institution 14 issues unvalued cards (not shown) to one or more POS retail establishments 18 within POS retail establishment network 17. A card owner account 30 is created with or at POS retail establishment 18 to generate valued card 12.

The card owner transfers 112 valued card 12 to identified recipient 34. Valued cards 12 are suitable for presenting to identified recipients 34 as holiday, birthday and/or graduation gifts. Upon transferring valued card 12 to identified recipient 34, the card owner authorizes identified recipient 34 to utilize valued card 12 to purchase goods and/or services provided by one or more POS retail establishments 18 in POS retail establishment network 17. Such authorization is limited to the purchase value or a remaining balance of the purchase value. Thus, identified recipient 34 may purchase goods and/or services utilizing all or only a portion of the purchase value of valued card 12.

Utilizing valued card 12, identified recipient 34 conducts transactions 114 with one or more POS retail establishments 18 in POS retail establishment network 17 to purchase goods and/or services from respective POS retail establishment 18. During the transaction, in one embodiment computer 20 at POS retail establishment 18 communicates with computer 16 at card issuing institution 14 to verify 116 the identity of identified recipient 34 and an amount of the purchase value remaining on valued card 12. Information regarding a potential recipient is inputted 116 into computer 20, such as by sliding valued card 12 through card reader 22. In a particular embodiment, the information is transmitted from computer 20 to computer 16. Upon verifying that the potential recipient is in fact an identified recipient 34 who is authorized to purchase goods and/or services utilizing valued card 12, computer 20 confirms whether valued card 12 has expired 118. In this embodiment, a recipient account for one or more identified recipients is established. When computer 16 receives a request for authorization of a transaction to support the purchase, information representative of the purchase price and/or a potential recipient is transmitted from computer 20 to computer 16. Upon verification that the potential recipient is an identified recipient 34, computer 16 authorizes the transaction in an amount not exceeding the remaining balance of the recipient account. The request is generated from computer 20 located at POS retail establishment 18 and received by remote computer 16 of card issuing institution 14 operatively coupled to computer 20.

If valued card 12 has not expired and valued card 12 has a present value greater than $0.00, computer 20 authorizes 120 completion of the transaction. In a particular embodiment, computer 20 transmits 122 a signal to computer 16 requesting authorization from card issuing institution 14 to complete the transaction. Computer 20 transmits signals representing information regarding potential recipients and/or sales information including, without limitation, a retail price for each item and/or service selected for purchase.

When identified recipient 34 purchases goods and/or services utilizing valued card 12 during a transaction, a purchase price of the purchased goods and/or services is debited or deducted from the purchase value of valued card 12 and the remaining balance on valued card 12 is adjusted. In a particular embodiment, funds are withdrawn from card owner account 30 equal to the purchase price and payable to the merchant from whom the goods and/or services are purchased. The remaining balance equal to a difference between the purchased value and the purchase price debited from card owner account 30 is calculated. In one embodiment, computer 16 receives a request for authorization of a transaction to support the purchase that includes information representative of the purchase price and a potential recipient. The potential recipient is verified as identified recipient 34 and the transaction is authorized in an amount not exceeding the remaining balance of card owner account 30. The request is generated at computer 20 located at POS retail establishment 18. The generated request is received by issuing institution 14 at remote computer 16 in communication with computer 20.

Upon completion 124 of the transaction, a determination 126 is made by computer 16 and/or computer 20 whether valued card 12 has a balance of $0.00. If the balance of valued card 12 is greater than $0.00, identified recipient 34 is authorized 128 to continue purchasing goods and/or services utilizing valued card 12. If, however, the balance of valued card 12 is $0.00, card owner account 30 is terminated 130.

In one embodiment, if computer 16 and/or computer 20 determines that valued card 12 has expired at step 118, the card owner is reimbursed 132 a percentage of a remaining balance of the purchase value at an expiration date pursuant to the agreement and card owner account 30 is terminated 130. Additionally or alternatively, the card owner is automatically reimbursed 132 a percentage of a remaining balance of the purchase value at the expiration date pursuant to the agreement and card owner account 30 is terminated 130 without identified recipient 34 attempting to utilize valued card 12 for completing a transaction for goods and/or services.

In an alternative embodiment, the agreement between the card owner and card issuing institution 14 provides a schedule that deducts a portion of the purchase value or the remaining value after designated time periods. In a particular embodiment, a percentage value, such as 2% or 5%, or a money value, such as $2.00 or $5.00, is deducted from the remaining value of valued card 12 at least one designated time period. In this embodiment, the designated time period may be one month, one year or any suitable designated time period. Thus, for example, at one year from issuance of valued card 12, each month a percentage value or a money value is deducted from the remaining value. A portion of the value deductions may be reimbursed to the card owner. In a particular embodiment, these deductions are prevented by the recipient's usage of valued card 12 to purchase goods and/or services.

While the invention has been described in terms of various specific embodiments, those skilled in the art will recognize that the invention can be practiced with modification within the spirit and scope of the claims.

What is claimed is:

1. A method for purchasing goods and services in transactions utilizing a valued card, said method comprising:
    issuing to a card owner from an issuing institution a valued card pursuant to an agreement between the card owner and the issuing institution, the valued card having a purchase value provided by the card owner and an expiration date associated therewith;
    transferring the valued card from the card owner to a recipient having authority to purchase goods and services utilizing at least a portion of the purchase value; and
    reimbursing the card owner a percentage of a remaining balance of the purchase value at the expiration date pursuant to the agreement, the remaining balance equal to a difference between the purchase value and the portion of the purchase value utilized by the recipient.

2. A method in accordance with claim 1 further comprising:
    purchasing at least one of goods and services by the recipient utilizing the valued card during a transaction; and
    debiting a purchase price of at least one of purchased goods and purchased services from the purchase value to adjust the remaining balance.

3. A method in accordance with claim 2 wherein debiting a price of the at least one of purchased goods and purchased services from the purchase value to adjust the remaining balance further comprises:
    withdrawing funds equal to the purchase price from a card owner account established with the issuing institution payable to a point-of sale retail establishment from where goods and services are purchased; and
    calculating the remaining balance, the remaining balance equal to a difference between the purchased value and the purchase price debited from the card owner account.

4. A method in accordance with claim 3 further comprising:
    receiving a request for authorization of a transaction to support the purchase comprising information representative of the purchase price and a potential recipient;
    verifying that the potential recipient is an identified recipient; and
    authorizing the transaction in an amount not exceeding the remaining balance of the card owner account.

5. A method in accordance with claim 4 further comprising generating the request at a first computer located at a point-of-sale retail establishment, the generated request received by the issuing institution at a remote second computer operatively coupled to the first computer.

6. A method in accordance with claim 1 wherein issuing to a card owner from an issuing institution a valued card pursuant to an agreement further comprises:
    issuing a plurality of unvalued cards to a point-of-sale retail establishment; and
    creating an account for the card owner with the point-of-sale retail establishment to generate the valued card.

7. A method in accordance with claim 1 wherein issuing to a card owner from an issuing institution a valued card pursuant to an agreement further comprises crediting a card owner account with a credit value equal to the purchase value.

8. A method in accordance with claim 1 wherein transferring the valued card to a recipient further comprises establishing a recipient account for at least one identified recipient.

9. A method in accordance with claim 8 further comprising:
    receiving a request for authorization of a transaction to support the purchase comprising information representative of the purchase price and a potential recipient of the at least one identified recipients;
    verifying that the potential recipient is one of the at least one identified recipients; and
    authorizing the transaction in an amount not exceeding the remaining balance of the recipient account.

10. A method in accordance with claim 9 further comprising generating the request at a first computer located at a point-of-sale retail establishment, the generated request received by the issuing institution at a remote second computer operatively coupled to the first computer.

11. A method in accordance with claim 1, further comprising crediting the card owner with interest earned on the purchase value until the recipient uses the valued card to purchase goods and services.

12. A valued card system comprising:
    a card owner account established with an issuing institution pursuant to an agreement between a card owner and the issuing institution;
    a valued card issued from the issuing institution to the card owner, said valued card having an expiration date and a purchase value provided by the card owner and funded by said card owner account authorizing a recipient to purchase at least one of goods and services utilizing at least a portion of the purchase value upon transfer of said valued card from the card owner to the recipient; and
    a first computer located at the issuing institution in communication with a second computer located at a point-of-sale retail establishment, said first computer configured to:
    authorize a transaction between the recipient and the point-of-sale retail establishment to purchase the at least one of goods and services utilizing said valued card;

debit a price of the purchased goods and services from the purchase value in response to the transaction to adjust a remaining balance on said card owner account;

reimburse the card owner a percentage of the remaining balance when said valued card expires pursuant to the agreement, the remaining balance equal to a difference between the purchase value and the price debited from the purchase value in response to the transaction between the recipient and the point-of-sale retail establishment; and terminate said card owner account at the expiration date.

13. A valued card system in accordance with claim 12 further comprising a plurality of unvalued cards issued by the issuing institution to the point-of-sale retail establishment, said first computer further configured to create an account for the card owner with the point-of-sale retail establishment to generate said valued card.

14. A valued card system in accordance with claim 12 wherein said first computer is further configured to credit said card owner account with a credit value equal to the purchase value.

15. A valued card system in accordance with claim 14 wherein said first computer is further configured to:
   authorize a withdrawal of funds equal to the price from said card owner account payable to the point-of-sale retail establishment from where the at least one of goods and services are purchased; and
   calculate the remaining balance.

16. A valued card system in accordance with claim 15 wherein said first computer is further configured to:
   receive from the second computer a request for authorization of a transaction to support the purchase, the request comprising information representative of the purchase price and a potential recipient;
   verify that the potential recipient is an identified recipient; and
   authorize the transaction in an amount not exceeding the remaining balance.

17. A valued card system in accordance with claim 12 further comprising at least one recipient account established with the issuing institution pursuant to the agreement, each of said at least one recipient account designating at least one corresponding identified recipient.

18. A valued card system in accordance with claim 17 wherein said first computer further configured to:
   receive a request for authorization of a transaction to support the purchase, the request comprising information representative of the purchase price and a potential recipient of the at least one identified recipients;
   verify that the potential recipient is one of the at least one identified recipients; and
   authorize the transaction in an amount not exceeding the remaining balance of a corresponding recipient account of said at least one recipient account.

19. A valued card system in accordance with claim 12 wherein said first computer further configured to determine the remaining balance at the expiration date to facilitate reimbursing the card owner the percentage of the remaining balance at the expiration date.

20. A valued card system in accordance with claim 12 wherein said first computer further configured to generate a negotiable instrument for facilitating reimbursing the card owner the percentage of the remaining balance at the expiration date.

21. A valued card system in accordance with claim 12 wherein said first computer is in communication with a network comprising multiple point-of-sale retail establishments that accept said valued card for the purchase of the at least one of goods and services.

22. A valued card system in accordance with claim 12 wherein said first computer is further configured to credit said card owner account interest at a rate set forth in the agreement.

23. A method for managing a valued card system, said method comprising:
   establishing a card owner account with an issuing institution pursuant to an agreement between a card owner and the issuing institution;
   issuing a valued card from the issuing institution to the card owner, the valued card having an expiration date and a purchase value provided by the card owner and funded by the card owner account authorizing a recipient other than the card owner to purchase at least one of goods and services utilizing at least a portion of the purchase value upon transfer of the valued card from the card owner to the recipient;
   authorizing a transaction between the recipient and a point-of-sale retail establishment to purchase the at least one of goods and services utilizing the valued card;
   debiting a price of the purchased goods and services from the purchase value in response to the transaction to adjust a remaining balance on the card owner account; and
   reimbursing the card owner a percentage of the remaining balance according to a predefined schedule when the valued card expires pursuant to the agreement, the remaining balance equal to a difference between the purchase value and the price debited from the purchase value in response to the transaction between the recipient and the point-of-sale retail establishment.

\* \* \* \* \*